(12) United States Patent
Huang et al.

(10) Patent No.: US 7,898,124 B2
(45) Date of Patent: Mar. 1, 2011

(54) STEP-BY-STEP MOTOR ABLE TO CARRY OUT UP-AND-DOWN TRANSMISSION

(76) Inventors: Hsian-Yi Huang, Tainan (TW); Hsiu-Ming Huang, Tainan (TW)

( * ) Notice: Subject to any disclaimer, the term of this patent is extended or adjusted under 35 U.S.C. 154(b) by 81 days.

(21) Appl. No.: 12/508,595

(22) Filed: Jul. 24, 2009

(65) Prior Publication Data

US 2011/0018371 A1   Jan. 27, 2011

(51) Int. Cl.
  *H02K 37/12*   (2006.01)
  *H02K 37/14*   (2006.01)
  *F16H 1/16*    (2006.01)

(52) U.S. Cl. .............. 310/49.18; 310/68 B; 310/89; 74/425

(58) Field of Classification Search .............. 310/49.18, 310/68 B, 89, 91; 74/425; 362/467, 524, 362/549
See application file for complete search history.

(56) References Cited

U.S. PATENT DOCUMENTS

| 4,501,981 | A  | * | 2/1985  | Hansen ................... 310/49.18 |
| 6,577,030 | B2 | * | 6/2003  | Tominaga et al. ......... 310/68 B |
| 7,287,888 | B2 | * | 10/2007 | Huang ........................ 362/524 |
| 7,408,277 | B2 | * | 8/2008  | Huang ..................... 310/49.18 |
| 7,500,413 | B2 | * | 3/2009  | Huang et al. .................. 74/425 |

* cited by examiner

Primary Examiner—Tran N Nguyen

(57) ABSTRACT

A step-by-step motor able to carry out up-and-down transmission includes a housing, a top rod, a circuit board, a magnet, a coil unit and a cover. The top rod is inserted in an insert hole of the housing, having a wall bored with a cut recess. The circuit board has a position-limiting switch received in an engage groove of the housing and provided with a sidewise rod inserted in the cut recess of the top rod. The magnet is fixed with a connecting member connecting a bearing, and the lower end of the top rod is engaged with the connecting member. The coil unit is fitted around the magnet and positioned in the housing, and the cover is covered on the bottom of the housing. The magnet is driven by the coil unit to rotate and actuate the top rod to move upward or downward steadily.

5 Claims, 6 Drawing Sheets

STEP-BY-STEP MOTOR ABLE TO CARRY OUT UP-AND-DOWN TRANSMISSION

BACKGROUND OF THE INVENTION

1. Field of the Invention

This invention relates to a step-by-step motor able to carry out up-and-down transmission, particularly to one convenient and quick in assembly and able to carry out transmission with steadiness and with less noise.

2. Description of the Prior Art

The headlamp of an automobile is generally provided with a step-by-step motor for adjusting the level of the headlamp. A conventional step-by-step motor 1, as shown in FIGS. 1 and 2, includes a housing 10 formed with an accommodating chamber 100 having a recessed chamber 101 disposed therein. The recessed chamber 101 is formed with an insert hole 102 in an upper wall and extending down to the topside of the housing 10 and having a side wall provided with positioning engage notches 103. The housing 10 has a topside bored with an insert groove 104 and outer wall fixed thereon with a plurality of engage projections 105. A driven gear 11 to be received in the accommodating chamber 100 of the housing 10 has topside mounted with a connecting block 110 with an insert hole 111 that has a lower portion provided with female threads 112. A worm gear 12 positioned at one side of the driven gear 11 has a topside set with a transmitting gear 120 engaged with the driven gear 11. A top rod 13 is inserted through both the insert hole 111 of the driven gear 11 and the insert hole 102 of the housing 10, having a lower portion formed with male threads 130 to be screwed with the female threads 112 of the driven gear 11. Further, the top rod 13 has an outer wall fixed thereon with plural lengthwise projections 131 to be respectively fitted in the positioning engage notches 103 of the housing 10 and a lower side provided with an interacting block 132 with an engage notch 133. A transmission motor 14 to be installed in the accommodating chamber 100 of the housing 10 is provided with a worm 140 engaged with the worm gear 12. A circuit board 15 assembled in the accommodating chamber 100 of the housing 10 and located at one side of the transmission motor 14 is provided with a position-limiting switch 150 having a sidewise rod 151 fitted in the engage notch 133 of the top rod 13, also disposed thereon with a bayonet socket 152 aligned to the insert groove 104 in the topside of the housing 10. A cover 16 to be covered on the bottom of the housing 10 has an outer wall bored with a plurality of engage grooves 160 to be respectively engaged with the engage projections 105 of the housing 10, thus finishing assembling a conventional step-by-step motor 1.

In using, after the worm gear 12 is actuated to rotate by the worm 140 of the transmission motor 14, the transmitting gear 120 on the worm gear 12 will drive the driven gear 11 to rotate and actuate the top rod 13 to move upward or downward, and thus the top rod 13 connected with the headlamp can adjust the angles of the headlamp. When the top rod 13 is actuated by the driven gear 11 to move upward or downward, the interacting block 132 at the lower side of the top rod 13 will drive the sidewise rod 151 of the position-limiting switch 150 on the circuit board 15 to move upward or downward. Thus, the elevation angle of the headlamp can be adjusted and fixed in position.

However, the conventional step-by-step motor 1 functions to carry out up-and-down transmission by means of mutual engagement and relative motion of the worm 140 of the transmission motor 14 with the worm gear 12 and the transmitting gear 120 on the worm gear 12 with the driven gear 11. Thus, after used for a long period of time, the gears are easy to be worn off and may produce tooth leap, unable to carry out transmission steadily and likely to make great noises. In addition, the conventional step-by-step motor 1 is complicated in structure and hard to be assembled.

SUMMARY OF THE INVENTION

The objective of this invention is to offer a step-by-step motor able to carry out up-and-down transmission, convenient and quick in assembling, able to carry out transmission with steadiness and with less noise.

The step-by-step motor in the present invention includes a housing, a top rod, a circuit board, a magnet, a coil unit and a cover combined together.

The housing is formed with an accommodating chamber disposed inside with a projecting edge having a recessed chamber formed therein. The housing has a topside bored with an insert hole communicating with the recessed chamber and having an inner wall disposed with positioning guide grooves. The recessed chamber has one side wall bored with an engage groove, and the accommodating chamber has one inner wall formed with a recessed groove communicating with the engage groove. The accommodating chamber has two opposite sides respectively provided with a positioning insert groove and the housing further has one side cut with a notch.

The top rod to be inserted in the insert hole of the housing has a lower portion provided with male threads and an outer wall fixed thereon with lengthwise projections to be respectively engaged in the positioning guide grooves. The top rod further has a side wall provided with a cut recess.

The circuit board to be installed in the accommodating chamber of the housing is provided thereon with conducting strips to be received in the recessed groove of the housing. The conducting strips have one end assembled with a position-limiting switch to be received in the engage groove of the housing. The position-limiting switch is secured with a sidewise rod to be inserted in the cut recess of the top rod. The circuit board further has two opposite sides respectively provided with a plug seat.

The magnet received in the accommodating chamber of the housing is formed in the interior with an insert hole having a connecting member fixed therein, and the connecting member is disposed with an insert hole formed with female threads. A bearing is connected with the connecting member and positioned at the topside of the magnet.

The coil unit is to be assembled in the accommodating chamber of the housing, composed of a right-handed coil and a reverse coil superposed on each other. The right-handed coil and the reverse coil have their line terminals connected to a socket.

The cover is covered on the bottom of the housing.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
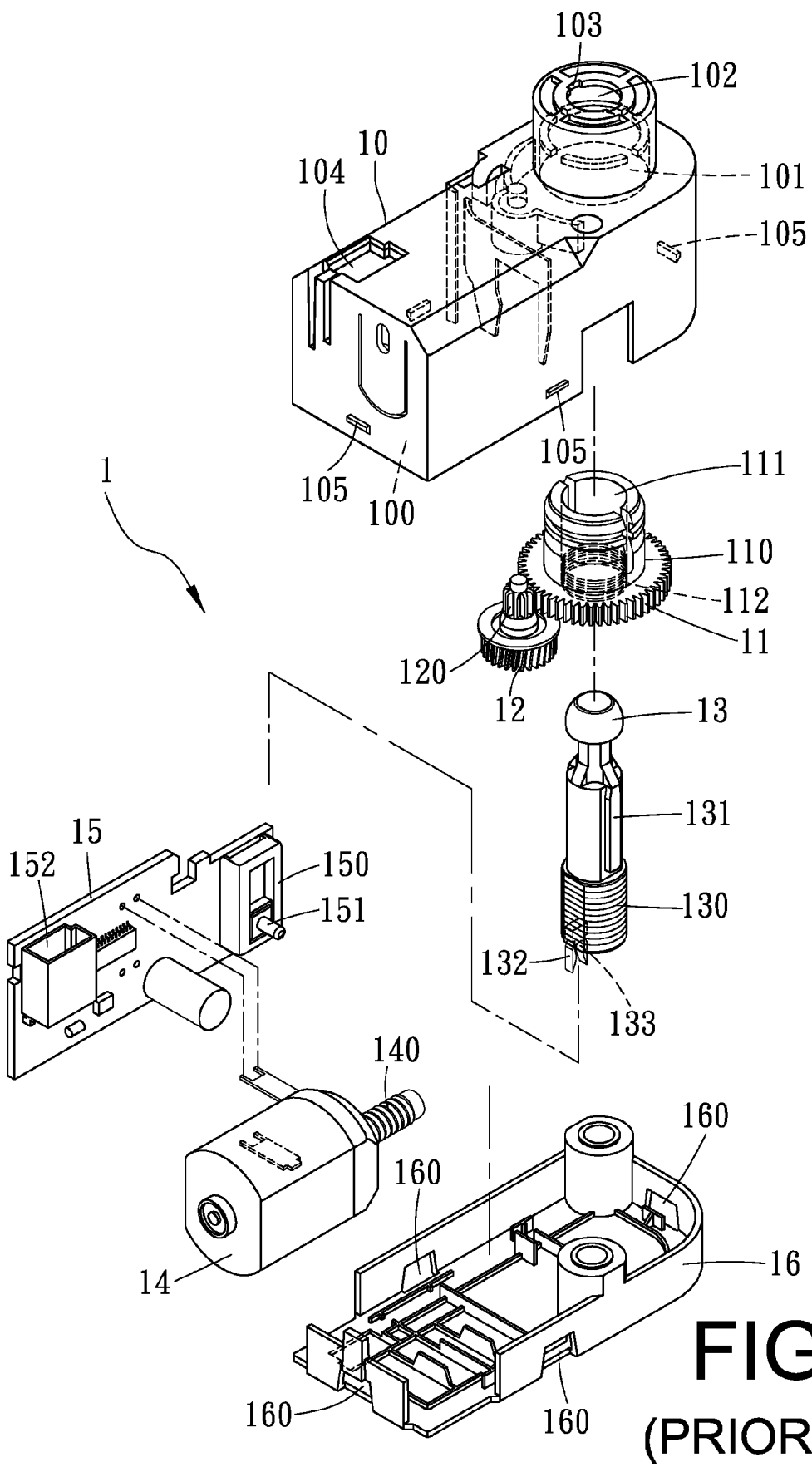
FIG. 1 is an exploded view of a conventional step-by-step motor.
Figure 2:
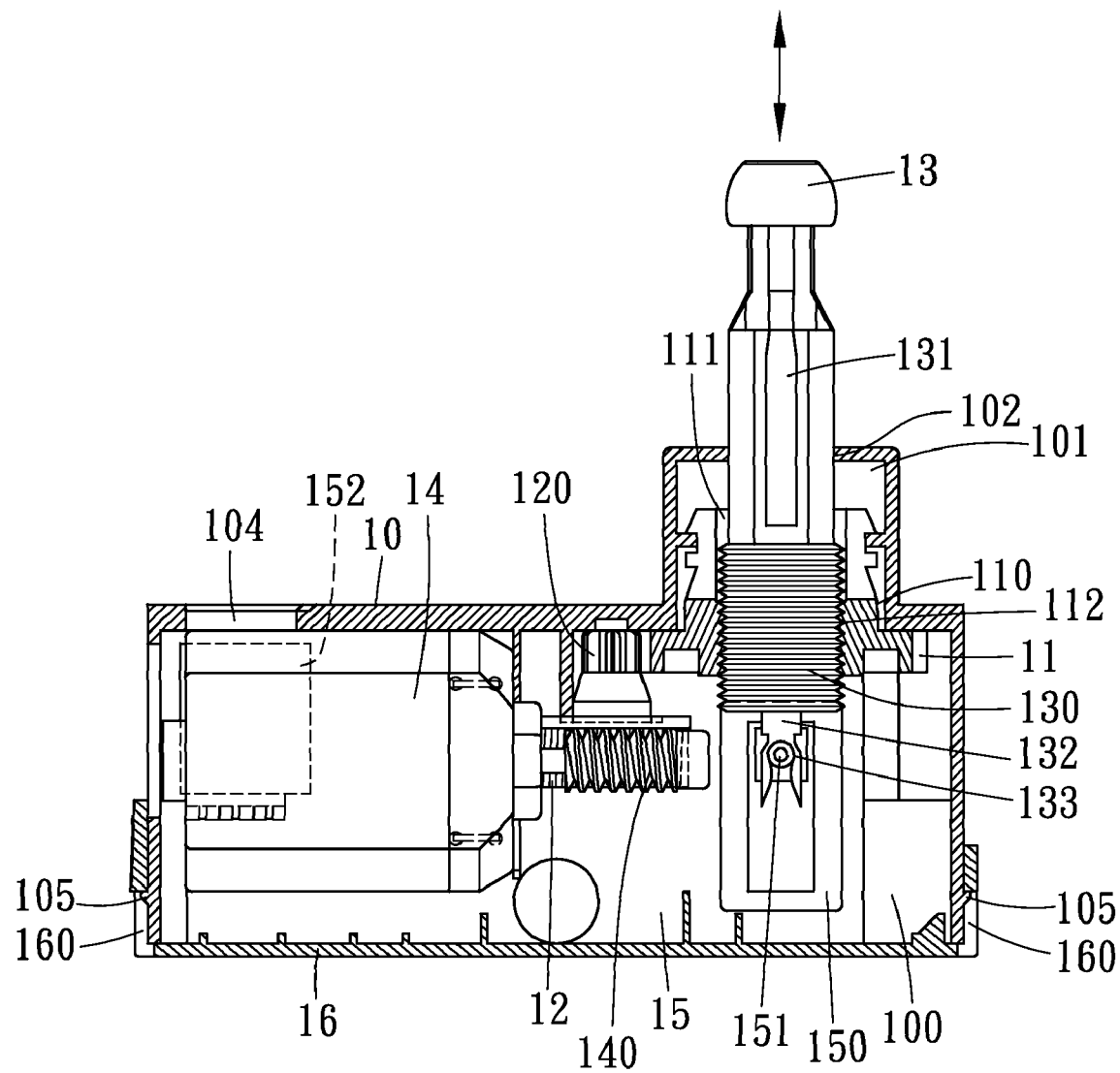
FIG. 2 is a cross-sectional view of the conventional step-by-step motor.
Figure 3:
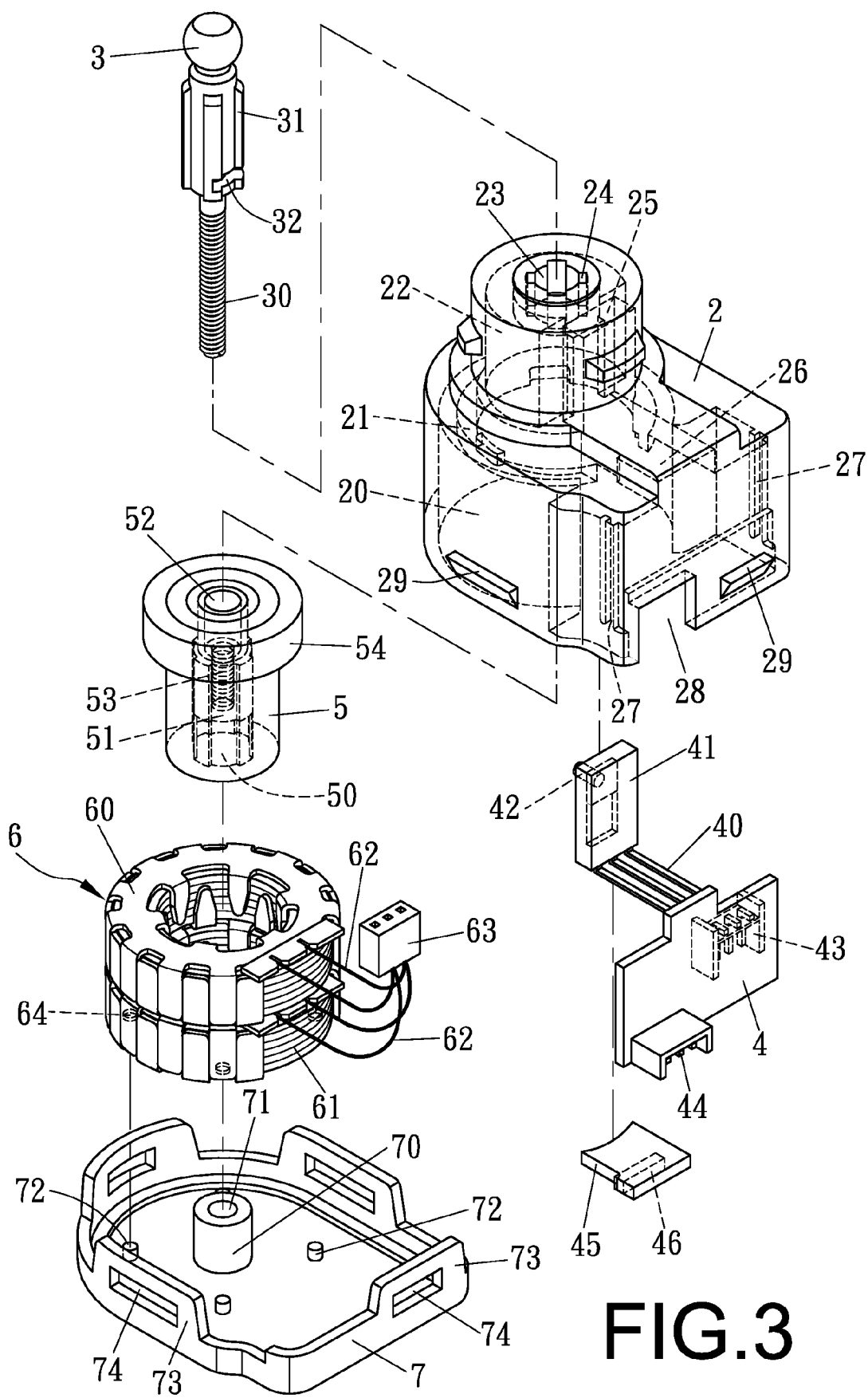
FIG. 3 is an exploded perspective view of a step-by-step motor in the present invention.
Figure 4:
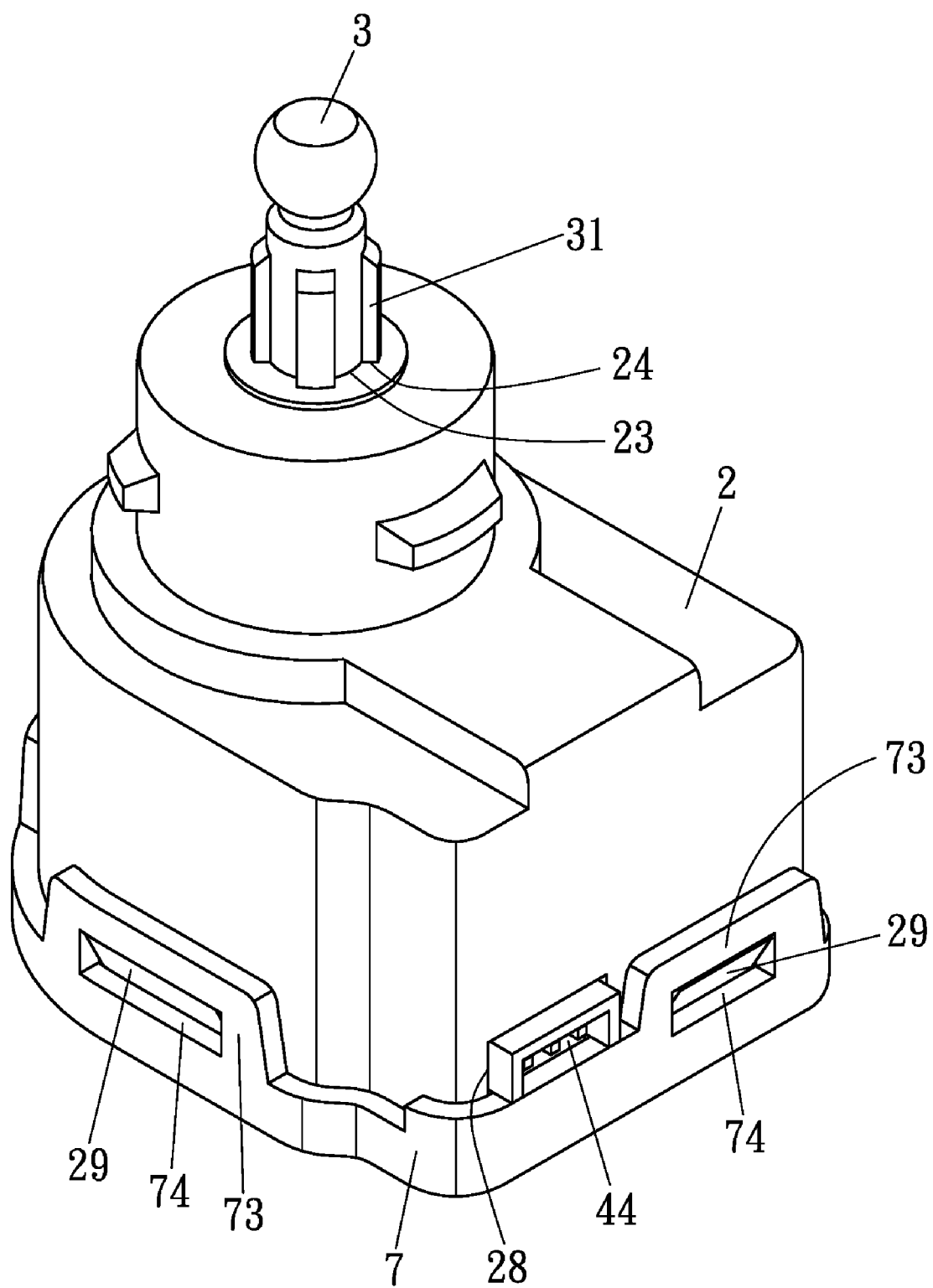
FIG. 4 is a perspective view of the step-by-step motor in the present invention.
Figure 5:
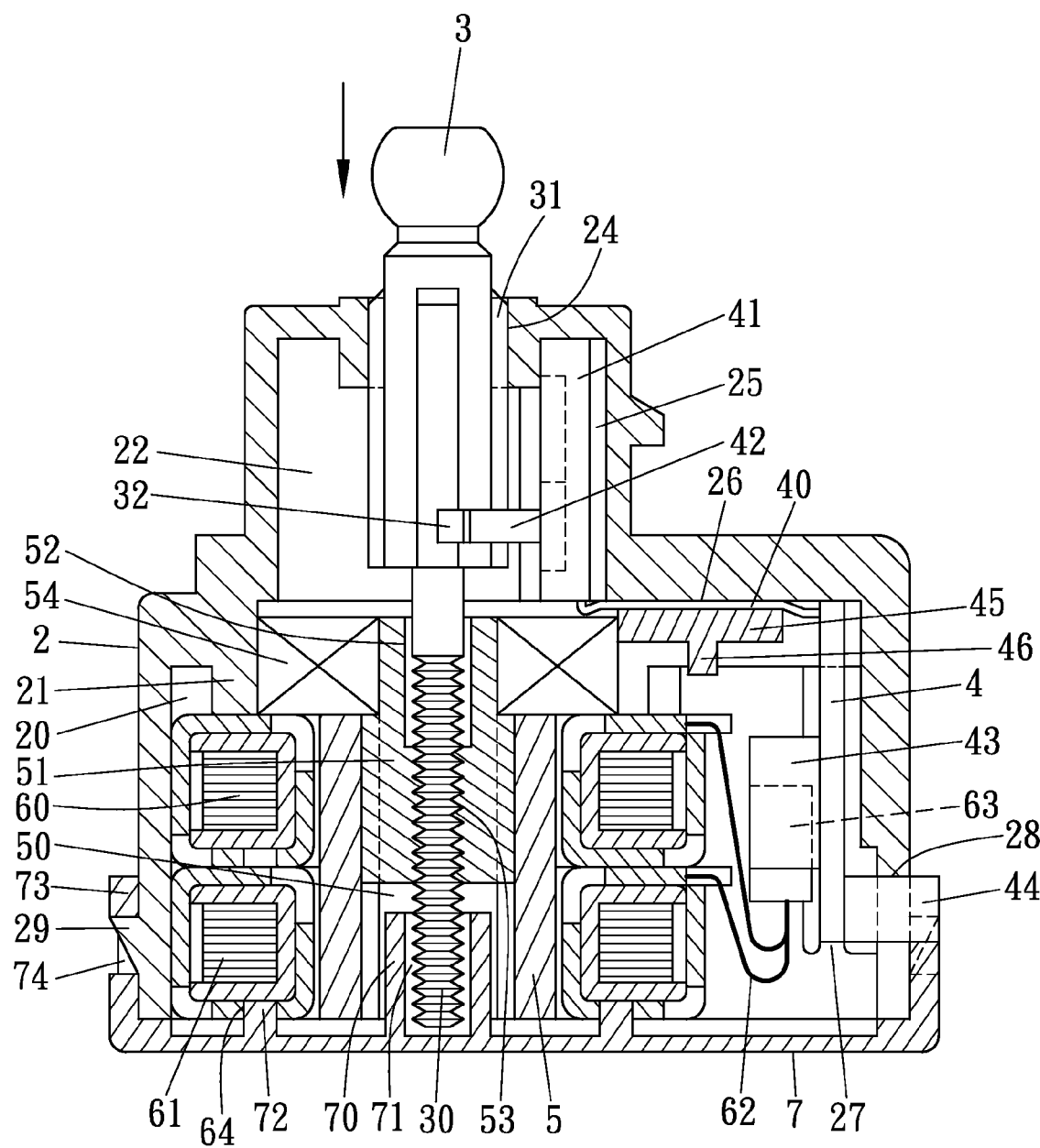
FIG. 5 is a cross-sectional view of the step-by-step motor in the present invention, showing that a top rod is moved downward.

A preferred embodiment of a step-by-step motor able to carry out up-and-down transmission in the present invention, as shown in FIGS. 3, 4 and 5, includes a housing 2, a top rod 3, a circuit board 4, a magnet 5, a coil unit and a cover 7 as main components combined together.

The housing 2 is formed with an accommodating chamber 20 provided inside with a projecting edge 21 with a recessed chamber 22 disposed in the interior. The housing 2 has topside bored with an insert hole 23 communicating with the recessed chamber 22 and having inner wall cut with a plurality of lengthwise positioning guide grooves 24. The recessed chamber 22 has one side wall bored with an engage groove 25, and the accommodating chamber 20 has an inner wall disposed with a recessed groove 26 communicating with the engage groove 25 and two opposite sides respectively provided with a positioning insert groove 27. Further, the housing 2 is cut with a notch 28 at the bottom of one side and provided with a plurality of positioning engage members 29 at locations near the bottom of the outer wall.

The top rod 3 is to be inserted in the insert hole 23 of the housing 2, having a lower portion provided with male threads 30 and an outer wall secured thereon with plural lengthwise projections 31 and further having one side wall provided with a cut recess 32.

The circuit board 4 received in the accommodating chamber 20 of the housing 2 is provided with plural conducting strips 40 having one end fixed with a position-limiting switch 41 with a sidewise rod 42. The circuit board 4 further has two opposite side respectively disposed with a socket 43, 44, and an isolating plate 45 with a projection 46 is assembled under the conducing strips 40.

The magnet 5 to be positioned in the accommodating chamber 20 of the housing 2 is bored with a lengthwise insert hole 50 provided therein with a connecting member 51 with an insert hole 52 formed therein with female threads 53. A bearing 54 is connected to the upper side of the magnet 5 by the connecting member 51.

The coil unit 6 is installed in the accommodating chamber 20 of the housing 2, composed of a right-handed coil 60 and a reverse coil 61 superposed on each other. The line terminals 62 of both the right-handed coil 60 and the reverse coil 61 are connected to a socket 63, and the reverse coil 61 is bored with a plurality of recessed holes 64 in the underside.

The cover 7 to be covered on the bottom of the housing 2 is provided inside with an upright post 70 having a center recessed hole 71. Furthermore, the cover 7 has an inside fixed thereon with a plurality of positioning projections 72 and peripheral edge formed with a plurality of positioning plates 73 respectively bored with a positioning fitting hole 74.

In assembling, referring to FIGS. 3, 4 and 5, firstly, the top rod 3 is inserted into the housing 2 through the insert hole 23 at the upper side of the housing 2, and then the circuit board 4 is received in the accommodating chamber 20 of the housing 2 to have two sides of the circuit board 4 respectively inserted in the two opposite positioning insert grooves 27 at the inner wall of the housing 2 to firmly position the circuit board 4 in the accommodating chamber 20 of the housing 2.

At this time, the conducting strips 40 on the circuit board 4 are positioned in the recessed groove 26 inside the accommodating chamber 20, while the position-limiting switch 41 is inserted in the engage groove 25 at one side of the recessed chamber 22 to have the sidewise rod 42 on the position-limiting switch 41 fitted in the cut recess 32 in the wall of the top rod 3, and the socket 44 at the outer side of the circuit board 4 positioned in the notch 28 of the housing 2 and then have the isolating plate 45 fitted in the recessed groove 26 of the housing 2 to press and position the conducting strips 40 in the recessed groove 26. Next, the magnet 5 and the bearing 54 connected by the connecting member 51 are received in the accommodating chamber 20 of the housing 2, and then the male threads 30 of the top rod 3 are engaged with the female threads 53 of the connecting member 51 to connect the top rod 3 together with the connecting member 51. Subsequently, the bearing 54 is pressed and positioned in the recessed chamber 22 of the housing 2 to fix the magnet 5 in the accommodating chamber 20 of the housing 5, and then the coil unit 6 is installed in the accommodating chamber 20 of the housing 2 to have the magnet 5 fitted in the center of the coil unit 6 and the socket 63 of the coil unit 6 connected with the socket 43 at the inner side of the circuit board 4. Lastly, the cover 7 is covered on the bottom of the housing 2, letting the upright post 70 of the cover 7 inserted in the insert hole 50 of the magnet 5 and the lower end of the top rod 3 extended into the recessed hole 71 of the upright post 70. Simultaneously, the positioning projections 72 on the cover 7 are respectively fitted in the recessed holes 64 at the underside of the reverse coil 61 to fix the coil unit 6 in place, and the positioning engage members 29 on the outer wall of the housing 2 are respectively fitted in the positioning engage holes 74 of the cover 7 to combine the cover 7 and the housing 2 together, thus finishing assembling the step-by-step motor.

Figure 6:
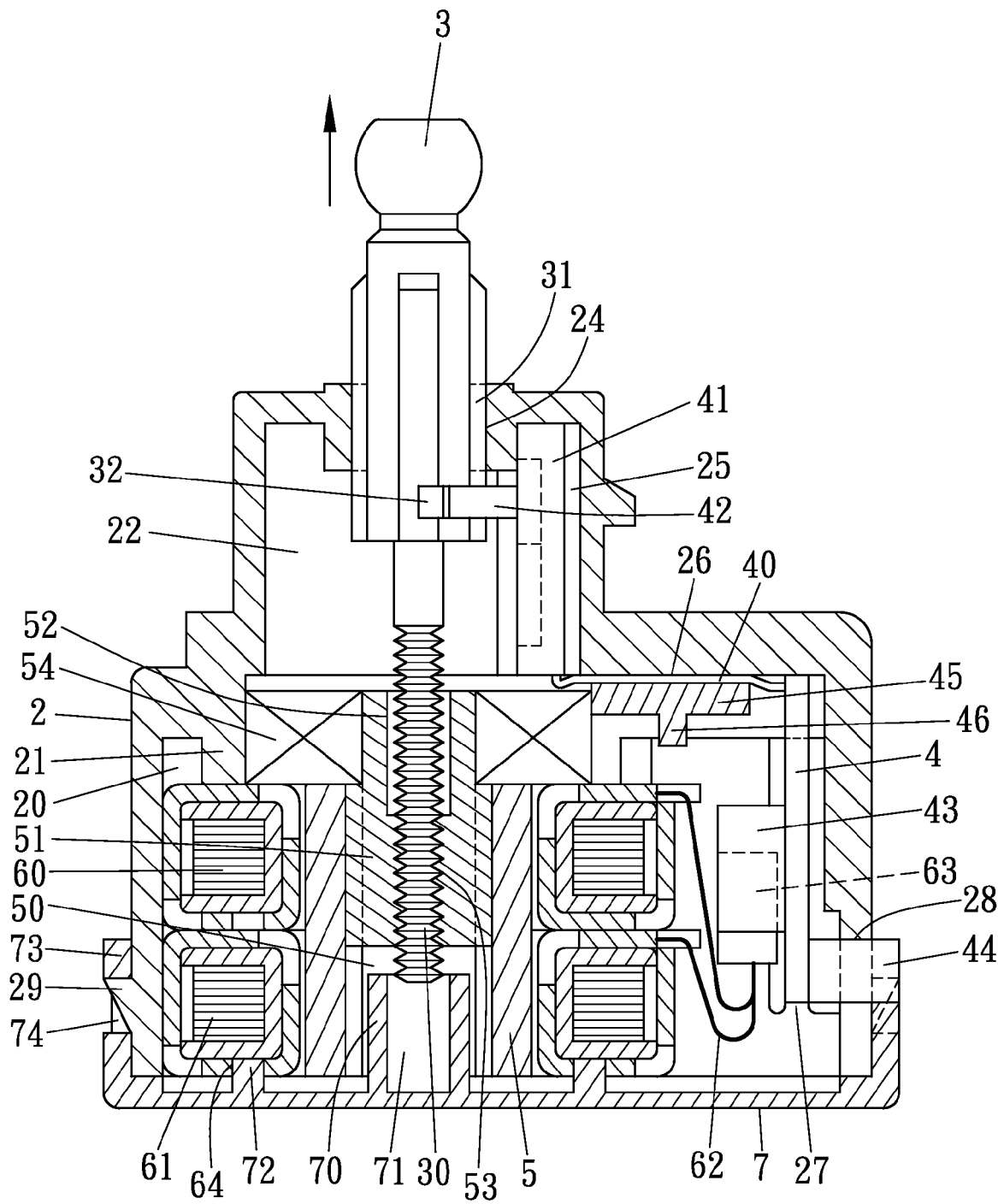
FIG. 6 is a cross-sectional view of the step-by-step motor having the top rod moved upward in the present invention.

In using, to have the top rod 3 moved upward, referring to FIG. 6, after the right-handed coil 60 is controlled by the circuit board 4 to make electric connection, the magnet 5 together with the connecting member 51 will be actuated to rotate clockwise, but the top rod 3, which is threadably combined with the connecting member 51 and restricted by the positioning guide grooves 24 of the housing 2, will be unable to rotate together with the magnet 5, merely actuated to move up straight by relative motion of the male threads 30 at the lower portion of the top rod 3 and the female threads 53 of the connecting member 51, thus attaining the object of moving the top rod 3 upward. When the top rod 3 moved upward, the sidewise rod 42 of the position-limiting switch 41, which is engaged in the cut recess 32 of the top rod 3, will synchronously be actuated to move upward, and when the sidewise rod 42 is moved to the upper end of the position-limiting switch 41, that is, when the top rod 3 reaches an uppermost location, the position-limiting switch 41 will immediately cut off electricity and the right-handed coil 60 will no more make electric connection to let the top rod 13 stop operating, thus finishing adjusting upward the elevation angle of the headlamp.

On the contrary, to move the top rod 3 downward, as shown in FIG. 5, after the reverse coil 61 is controlled by the circuit board 4 to make electric connection, the magnet 5 together with the connecting member 51 will rotate counterclockwise. At this time, the top rod 3, which is screwed with the connecting member 51 and restricted by the positioning guide grooves 24 of the housing 2, will be unable to rotate together with the magnet 5, only able to be moved straight downward by relative motion of the male threads 30 at the lower portion of the top rod 3 and the female threads 53 of the connecting member 51, thus finishing moving the top rod 3 downward.

When the top rod 3 is moved downward, the sidewise rod 42 of the position-limiting switch 41, which is fitted in the cut recess 32 of the top rod 31, will be actuated by the top rod 3 to move downward, and when the sidewise rod 42 is moved to a lower end of the position-limiting switch 41, that is, when the top rod 3 is at a lowermost location, the position-limiting switch 41 will cut off electricity right away and the reverse coil 61 will no longer make electric connection to stop the top rod 3 from operating, thus finishing adjusting downward the elevation angle of the headlamp.

Specifically, in this invention, the magnet 5 is driven by the coil unit 6 to rotate and actuate the top rod 3 to move upward or downward, thus enabling the top rod 3 to move upward or downward with steadiness and with less noise. In addition, the step-by-step motor of this invention is simple in structure and small in volume, taking less space.

While the preferred embodiment of the invention has been described above, it will be recognized and understood that various modifications may be made therein and the appended claims are intended to cover all such modifications that may fall within the spirit and scope of the invention.

What is claimed is:

1. A step-by-step motor able to carry out up-and-down transmission comprising:

a housing formed with an accommodating chamber in an interior, said accommodating chamber having inside provided with a projecting edge formed therein with a recessed chamber, said housing having a topside bored with an insert hole communicating with said recessed chamber, said insert hole having an inner wall provided with positioning guide grooves, said recessed chamber having one side wall bored with an engage groove, said accommodating chamber having an inner wall formed with a recessed groove communicating with said engage groove, said accommodating chamber having opposite sides respectively disposed with a positioning insert groove, said housing cut with a notch at one side;

a top rod inserted in said insert hole of said housing, said top rod having a lower portion provided with male threads, said top rod fixed with lengthwise projections on an outer wall, said lengthwise projections respectively fitted in said positioning guide grooves of said housing, said top rod further having a wall disposed with a cut recess;

a circuit board installed in said accommodating chamber of said housing, said circuit board provided with conducting strips to be received in said recessed groove of said housing, said conducting strips having a position-limiting switch fixed at one end, said position-limiting switch positioned in said engage groove of said housing, said position-limiting switch secured thereon with a sidewise rod to be inserted in said cut recess of said top rod, said circuit board having two opposite sides respectively set with a socket;

a magnet received in said accommodating chamber of said housing, said magnet bored with an insert hole in a center, said insert hole fixed therein with a connecting member with an insert hole, said insert hole of said connecting member formed with female threads in an interior, a bearing connected to an upper side of said magnet by said connecting member;

a coil unit assembled in said accommodating chamber of said housing, said coil unit composed of a right-handed coil and a reverse coil superposed on each other, said right-handed coil and said reverse coil having their line terminals connected to a socket; and a cover covered on a bottom of said housing.

2. The step-by-step motor able to carry out up-and-down transmission as claimed in claim 1, wherein said housing has outer wall secured thereon with a plurality of positioning engage members, and said cover has peripheral edge formed with plural positioning plates respectively bored with a positioning engage hole, said positioning engage members of said housing respectively fitted in said positioning engage holes of said cover.

3. The step-by-step motor able to carry out up-and-down transmission as claimed in claim 1, wherein an isolating plate is positioned under said conducting strips and received in said recessed groove of said housing, said isolating plate having a projection fixed thereon.

4. The step-by-step motor able to carry out up-and-down transmission as claimed in claim 1, wherein said reverse coil has underside bored with a plurality of recessed holes, and said cover is provided inside with a plurality of positioning projections to be respectively fitted in said recessed holes of said reverse coil.

5. The step-by-step motor able to carry out up-and-down transmission as claimed in claim 1, wherein said cover is secured inside with an upright post having a center recessed hole.

* * * * *